United States Patent [19]

Iwase

[11] Patent Number: 5,090,999
[45] Date of Patent: Feb. 25, 1992

[54] PROCESS FOR THE REMOVAL OF NON-FERROUS METALS FROM SOLID FERROUS SCRAP

[75] Inventor: Masanori Iwase, Kyoto, Japan
[73] Assignee: Nippon Centronix, Ltd., Osaka, Japan
[21] Appl. No.: 632,342
[22] Filed: Dec. 21, 1990

[30] Foreign Application Priority Data

Dec. 27, 1989 [JP]  Japan ................................. 1-344870

[51] Int. Cl.$^5$ ............................................. C22B 21/00
[52] U.S. Cl. ........................................ 75/433; 75/587
[58] Field of Search .................. 75/587, 433; 420/590; 428/545

[56] References Cited

U.S. PATENT DOCUMENTS 3,396,777  8/1968  Reeling ................................. 428/545
3,634,066  1/1972  Matthews ............................. 420/590
4,511,398  4/1985  Kugler ................................. 75/587

Primary Examiner—Peter D. Rosenberg
Attorney, Agent, or Firm—Flynn, Thiel, Boutell & Tanis

[57] ABSTRACT

A process for removing non-ferrous metal, such as Cu, Sn, Zn or the like, from solid ferrous scrap, which includes the steps of: admixing solid ferrous scrap containing non-ferrous metal with liquid Al, Mg, and or alloys thereof comprising at least 20 wt. % in total of Al and/or Mg at a temperature of higher than the melting point of the liquid metal and lower than the melting point of Fe; and separating said solid ferrous scrap from said molten metal. The non-ferrous metals in contact with the liquid metal at high temperatures are efficiently dissolved into the liquid metal and transferred from the scrap to the liquid metal. The resulting ferrous scrap is suitable as a Fe source for electric-furnace steelmaking.

5 Claims, No Drawings

PROCESS FOR THE REMOVAL OF NON-FERROUS METALS FROM SOLID FERROUS SCRAP

BACKGROUND OF THE INVENTION

1. Field of the Invention

The present invention relates to a novel process or the removal of non-ferrous metals, such as copper, tin, zinc or the like, from solid ferrous scrap.

2. Related Art Statement

At the present, in North America, approximately 40% of total steel production depends on electric arc furnaces. Because of a number of advantages of the electric arc furnaces in comparison with basic oxygen processes, increasing trend in the production of electric-furnace steel would still continue even in the next centrury.

In terms of steel specifications and product quality, however, the electric-furnace steel has not always been without problems. Needless to say, the electric-furnace steelmaking relies on the supplies of ferrous scrap. At the present, the electric-furnace steelmakers produce primarily bars and structural shapes, while thin plate or sheet steel for deep drawing cannot be made via electric arc furnaces, because of relatively high concentrations of copper in the ferrous scrap. It has been well known that copper in steel at concentrations higher than 0.1% by weight causes hot shortness or embrittlement, which results in production problems especially during continuous casting of molten steel and mechanical working of solidified steel. The electric arc furnaces are not able to produce a low copper steel from a high copper scrap. Hence, the high copper scrap has not been utilized in electric furnace steelmaking for producing high-grade steel.

In general, the concentration of copper dissolved in steel currently produced is not more than 0.1% by weight, while ferrous scrap generated from mechanical working of steel or the automobile industry contains copper at a concentration of more than 0.6 wt.%. Normally, the majority, e.g., more than 85%, of copper in ferrous scrap is present as nearly pure metallic copper rather than dissolved elements in steel, in the form of wire for connecting electrical equipments. Namely, the difference in copper concentration between 0.6 wt.% in ferrous scrap and 0.1 wt.% in steel products is attributed to such copper wires mingled with the ferrous scrap.

A number of processes have so far been suggested for the removal of copper from solid or molten ferrous scrap, such as improved physical separation incorporating sorting of scrap, vacuum distillation, sulfide slagging, or the like.

The improved physical separation and sorting of scrap based on human power are able to reduce the copper content in the solid ferrous scrap. However, such techniques are time consuming and labor intensive, hence these are disadvantageous economically. The vacuum distillaion process is based on the fact that copper has a higher vapor pressure than iron. In this process, liquidized ferrous scrap is heated under vacuum for 30 to 60 minutes to evaporate copper. However, the vaporization rate is quite low, hence this process is not feasible for application in large-scale steel production.

J. F. Jordan established the sulfide slagging as a principle process for the removal of copper from liquid ferrous scrap in 1950 (U.S. Pat. No. 2,512,578, June 20, 1950). This process has been the most extensively investigated method. The sulfide slagging is based on the fact that copper sulfide is more stable than iron sulfide at temperatures higher than 600° C. Sodium sulfide is usually added to lower the melting point of iron sulfide and to increase the fluidity. The sulfide slagging can be applied to both solid and liquid ferrous scraps. However, disadvantage is that this process requires sulfides which have not appeared in large-scale industrial production. In addition, the treatment of waste sulfides would not be economical.

SUMMARY OF THE INVENTION

The object of the present invention is to provide a novel process for the removal of non ferrous metals, such as copper, tin, zinc or the like, from solid ferrous scrap. The inventor found the fact that by contacting solid ferrous scrap with a molten, aluminum and/or magnesium metal or alloy, non-ferrous metals, such as copper, tin, zinc or the like, intermingled with the scrap are dissolved into the molten metal or alloy and thus removed from the solid ferrous scrap.

DETAILED DESCRIPTION OF THE INVENTION

According to the process of the present invention, non-ferrous metals, such as copper, tin, zinc or the like, can be removed from the ferrous scrap. However, since copper, inter alia, is the typical detrimental impurity that should be removed from the ferrous scrap, a detailed explanation of the present invention will be given hereinafter mainly with reference to copper.

The present inventor has focused attention on the very low activities of copper in liquid aluminum. As mentioned previously, the majority, e.g., more than 85%, of copper in ferrous scrap is substantially pure copper. This fact corresponds, in a thermodynamic sense, to that copper in the ferrous scrap has a unit activity. Hence, when copper in the solid ferrous scrap is brought into contact with liquid aluminum, then dissolution of copper in the liquid aluminum will take place. This reaction, i.e., the dissolution of copper in the liquid aluminum, is spontaneous, because the copper activities are tremendously lowered when copper is transferred to the liquid aluminum from the solid ferrous scrap.

The relatively low activities of copper in liquid magnesium are to be mentioned. Because of the same reason as those for the liquid aluminum, when the solid ferrous scrap is brought into contact with the liquid magnesium, copper is dissolved and transferred into the liquid magnesium from the solid ferrous scrap.

At a fixed concentration of copper, the copper activities in aluminum are lower than those in magnesium. Hence, aluminum is more favorable than magnesium for the removal of copper from the solid ferrous scrap. However, a disadvantage of aluminum is that iron is somewhat soluble in the liquid aluminum. Hence, when the solid ferrous scrap is brought into contact with the liquid aluminum, then the dissolution of iron will also take place to a small extent, resulting in loss of iron from the ferrous scrap. Such a loss of iron can be minimized by using aluminum-magnesium alloys instead of the liquid aluminum. The present inventor found the fact that solubility of iron in liquid aluminum-magnesium alloys decreases with an increase of magnesium content.

Very low activities of copper in liquid aluminum-magnesium alloys are also to be mentioned here at this point. Hence, when the solid ferrous scrap is brought into contact with the liquid aluminum-magnesium alloys, copper is transferred to the liquid aluminum-magnesium alloys from the solid ferrous scrap.

A relatively high vapor pressure of magnesium is described. The boiling point of magnesium is 1,090° C., which is to be compared with that of aluminum, i.e., 2,520° C. Magnesium will be lost by vaporization upon being heated at temperatures higher than 1,090° C. Hence, the loss of magnesium from aluminum-magnesium alloys will increase with an increase of magnesium content.

Regarding the compositions of the metals or alloys used for the removal of non-ferrous metals, such as copper, tin, zinc or the like, from solid ferrous scrap, as long as the summation of the aluminum and magnesium contents in the alloy is at least 20%, preferably at least 30%, by weight, the ratio of aluminum to magnesium is not specifically limited. Namely, needless to say, 100% pure metallic aluminum or magnesium alone can be used. An alloy comprising at least 20% by weight of aluminum or magnesium and the remainder of other metal(s) also can be used. Further, the alloy may be binary, ternary or poly-elemental, including other elements, such as Cu, Fe, Sn, Zn or the like.

With respect of the composition, there may be a number of options depending on the market prices of aluminum, magnesium and ferrous scrap. If the loss of iron is acceptable because of a relatively low market price of the ferrous scrap, then the liquid aluminum metal may be used to remove copper from the solid ferrous scrap. Alternatively, if the market price of the ferrous scrap is increased, then one may choose aluminum-magnesium alloys rather than the aluminum metal. The concentration of magnesium in the alloy depends on the market price of magnesium.

In an alternative case where the magnesium price may fall down to a great extent, the magnesium metal or aluminum-magnesium alloys rich in magnesium would be preferred under such an economical situation.

According to the present invention, the solid ferrous scrap is admixed with the liquid aluminum metal, the liquid magnesium metal or liquid aluminum-magnesium alloys as mentioned above (hereinafter, may be generally referred to as "ALLOY") in a rotary kiln, for example, and heated at a temperature higher than the melting point of ALLOY and lower than the melting point of ferrous scrap, i.e., 1,535° C. In the case where ALLOY comprises magnesium, the temperature is preferred to be lower than the boiling point of magnesium, i.e., 1,090° C.

Further, if a longer duration is acceptable, the heating temperature can be lowered in the above range. The lower the heating temperature, the smaller the loss of the solid ferrous scrap. In any case, however, ALLOY must be in the liquid state. Alternatively, if a shorter duration is desirable, this process of the invention can be operated at a high temperature region in the above range. At temperatures higher than the melting point of copper, i.e., 1063° C., copper in solid ferrous scrap exists in the liquid state, resulting in accelerating the rate of copper removal. However, at such a high temperature, the loss of the solid ferrous scrap also increases. If the temperature is further increased, at last the ferrous scrap would be molten, resulting in the dissolution of ALLOY in the liquid scrap. In such cases, the removal of copper from the ferrous scrap cannot be expected according to the process of the present invention. Therefore, the temperature must be lower than the melting temperature of the ferrous scrap and is preferred to be lower than the melting point of copper.

In the process of the present invention, the ratio of ALLOY to solid ferrous scrap can be appropriately chosen on the basis of the copper content in the ferrous scrap. Namely, for a copper-rich scrap, the amount of ALLOY would be increased, while the reverse for scrap of less copper content. Thus, this ratio is not specifically limited.

ALLOY can be used repeatedly in the removal of non-ferrous metals from solid ferrous scrap, until the summation of the aluminum and magnesium contents in ALLOY reaches 20%, preferably 30%, by weight. If the summation of the aluminum and magnesium contents in ALLOY has reached 20% by weight after repeated use, new ALLOY of high aluminum and/or magnesium content can be admixed with the used ALLOY.

According to the process of the invention, the type and form of the apparatus to be utilized in bringing the solid ferrous scrap into contact with ALLOY are not specifically limited so far as the solid ferrous scrap can contact directly with molten ALLOY. Preferable examples of such an apparatus are rotary kilns and ladles.

The dissolution of copper in ALLOY can be expressed as follows:

$$Cu(s) = Cu(ALLOY) \tag{1}$$

where Cu(s) and Cu(ALLOY) indicate, respectively, copper in ferrous scrap and that in ALLOY. The free energy change being accompanied with reaction (1) is given by the following equation (2):

$$\Delta G(1) = RT \ln\{a_{cu}(ALLOY)/a_{cu}(scrap)\} \tag{2}$$

where $\Delta G(1)$ is the free energy change of reaction (1), R is the gas constant (1.987 cal/mol K), T is absolute temperature in K, $a_{cu}(ALLOY)$ represents the activity of copper in ALLOY, and $a_{cu}(scrap)$ is the activity of copper in scrap. It is again mentioned that the value for $a_{cu}(scrap)$ equals unity. Suppose that the activity of copper in ALLOY is 0.001 at a temperature of 1,273° K., for example, we have:

$$\Delta G(1) = 1.987 \times 1,273 \times \ln(0.001) = -17.475 \text{ cal/mol} \tag{3}$$

Namely, one obtains 17.475 kcal per one mole (63.5 g) of copper. This energy drives the transfer of copper from solid ferrous scrap to ALLOY.

The following examples are given for the purpose of illustration of this invention and are not intended as limitations thereof. In the examples, "percent" means by weight.

EXAMPLE 1

Removal of Copper from Ferrous Scrap containing 0.6% Copper by using an Al-Mg Binary Alloy One kilogram of ferrous scrap was charged in a small rorary kiln together with 100 g of an Al-Mg alloy. This scrap contained metallic copper in an amount of 0.6%, while the alloy comprised 50% Al and 50% Mg. The alloy in this example was prepared by melting low-grade aluminum scrap and low-grade magnesium scrap, so that the resulting alloy contained appreciable amounts of impurities. However, such impurities are acceptable in this invention.

The rotary kiln was heated up to 800° C. and kept at this temperature for 20 minutes. During this period, the rotary kiln was rotated in order to ensure direct contact between the solid ferrous scrap and the alloy. At 800° C., the scrap in the rotary kiln remained in the solid state, while the alloy was molten.

After a duration of 20 minutes, the alloy was withdrawn rom the rotary kiln inside which the solid ferrous scrap remained. The copper content in the solid ferrous scrap after treatment was found to be 0.1% or less.

EXAMPLE 2

Removal of Copper from Ferrous Scrap containing 0.6% Copper by using an Al-Mg-Cu Ternary Alloy The used alloy in the foregoing Example 1 was again charged into the rorary kiln. Since 5 g of copper was already dissolved in the used alloy, the alloy comprised 47.5% Al, 47.5% Mg and approximately 5% Cu after the treatment mentioned in Example 1. One kilogram of solid ferrous scrap containing 0.6% copper was again charged into the rotary kiln and treated for copper removal in the same manner as Example 1. The resulting solid ferrous scrap was found to contain copper in an amount of 0.1% or less. Then, the alloy was repeatedly used for the removal of copper in the same manner as the above. It was found that the removal of copper was effected substantially to the same extent until the copper content in the alloy reached 70%, in other words, the total content of Al and Mg reached 30%.

EXAMPLE 3

Removal of Copper from Ferrous Scrap containing 0.6% Copper by using nearly Pure Al The same procedure as Example 1 was repeated, exept that 300 g of nearly 100% aluminum metal was used in lieu of 100 g of the Al-Mg alloy. The copper content in the solid ferrous scrap after treatment was 0.1% or less.

EXAMPLE 4

Removal of Copper from Ferrous Scrap containing 0.6% Copper by using nearly Pure Mg The same procedure as Example 1 was repeated, exept that 300 g of nearly 100% magnesium metal was used in lieu of 100 g of the Al-Mg alloy. The copper content in the solid ferrous scrap after treatment was 0.1% or less.

EXAMPLE 5

Removal of Copper from Ferrous Scrap containing 0.6% Copper by using an Al-Cu-Fe Ternary Alloy The alloy used in this Example arose from aluminum which had been used repeatedly more than 100 times for the removal of copper. Hence, this alloy contained appreciable amounts of copper and iron; 60% Cu and 10% Fe, other than Al on the initial stage of treatment.

The same procedure as Example 1 was repeated, except that 300 g of the Al-Cu-Fe ternary alloy was used. The copper content in the solid ferrous scrap after treatment was found to be 0.1% or less. This alloy was further used repeatedly and remained effective until the Al content in the alloy reached 20%.

EXAMPLE 6

Removal of Copper, Tin and Zinc from Ferrous Scrap by using an Al-Cu-Fe-Sn-Zn Multi-Element Alloy Ferrous scrap containing 0.6% copper together with a small amounts of tin and zinc was treated. The alloy used in this Example originated from pure aluminum metal which had been used repeatedly more than 100 times for the removal of copper from ferrous scrap containing tin and zinc. Hence, this alloy contained appreciable amounts of copper as well as tin and zinc. In other words, it was demonstrated that this invention enables tin and zinc to be removed from the ferrous scrap. The same procedure as Example 1 was further repeated, except that 150 g of the alloy comprising 40% Al, 48% Cu, 10% Fe, 1% Sn and 1% Zn was used. The copper content in the solid ferrous scrap after treatment was found to be 0.1% or less. The Sn and Zn contents in the scrap after treatment substantially could not be detected. This Example proves that the removal of copper is still possible by using an alloy containing Sn and Zn, and that Sn and Zn also can be removed according to the present invention.

As explained above, the present invention enables the removal of non-ferrous metals, such as copper, tin, zinc or the like, from ferrous scrap, which has never been realized in a commercial scale. According to the process of the present invention, high-grade steel can be produced via electric arc furnaces, resulting in a tremendous contribution to the steel industry.

What is claimed is:

1. A process for removing non-ferrous metal from solid ferrous scrap, comprising the steps of: contacting solid ferrous scrap containing said non-ferrous metal with at least one molten metal material selected from the group consisting of aluminum, magnesium, and alloys thereof, at a temperature of higher than the melting point of said metal material and lower than the melting point of iron; and separating said solid ferrous scrap from said molten metal material.

2. The process according to claim 1, wherein said non-ferrous metal is at least one metal selected from the group consisting of copper, tin and zinc.

3. The process according to claim 1, wherein said material is an alloy comprising at least 20% by weight of aluminium and magnesium.

4. The process according to claim 1, wherein said temperature is lower than the melting point of copper.

5. The process according to claim 1, wherein said steps are repeated until a total content of aluminum, magnesium, or aluminum and magnesium in the molten metal material reaches 20% by weight.

* * * * *

UNITED STATES PATENT AND TRADEMARK OFFICE
CERTIFICATE OF CORRECTION

PATENT NO. : 5 090 999
DATED : February 25, 1992
INVENTOR(S) : Masanori IWASE

It is certified that error appears in the above-identified patent and that said Letters Patent is hereby corrected as shown below:

On the Title page,
In the Abstract, line 4; change "Mg, and or"
     to ---Mg, or---.

Column 6, lines 51 and 52; change "said material" to
     to ---said metal material---.

Signed and Sealed this

Fifteenth Day of June, 1993

Attest:

MICHAEL K. KIRK

Attesting Officer    Acting Commissioner of Patents and Trademarks